US012433239B2

(12) United States Patent
Tang (10) Patent No.: US 12,433,239 B2
(45) Date of Patent: Oct. 7, 2025

(54) PET TOILET WITH A DETACHABLE FECAL COLLECTION BOX TO A BOTTOM OF A BASE (71) Applicant: PETPIVOT INC, Portland, OR (US)

(72) Inventor: Tieqiang Tang, Shaoyang (CN)

(73) Assignee: PETPIVOT INC, Portland, OR (US)

( * ) Notice: Subject to any disclaimer, the term of this patent is extended or adjusted under 35 U.S.C. 154(b) by 0 days.

(21) Appl. No.: 18/392,888

(22) Filed: Dec. 21, 2023

(65) Prior Publication Data
US 2025/0194554 A1    Jun. 19, 2025

(30) Foreign Application Priority Data

Dec. 14, 2023   (CN) .......................... 202323419782.6

(51) Int. Cl.
A01K 1/01    (2006.01)
(52) U.S. Cl.
CPC .................................. A01K 1/0114 (2013.01)
(58) Field of Classification Search
CPC .... A01K 1/0114; A01K 1/0107; A01K 1/011; A01K 1/0152
USPC ................................................ 119/161, 165
See application file for complete search history.

(56) References Cited

U.S. PATENT DOCUMENTS

| | | | | |
|---|---|---|---|---|
| 5,042,430 A * | 8/1991 | Casmira | ............... | A01K 1/0107 119/161 |
| 6,615,765 B1 * | 9/2003 | Thomas | ............... | A01K 1/0107 119/168 |
| 7,395,784 B2 * | 7/2008 | Hirokawa | ............ | A01K 1/0107 119/161 |
| 7,584,717 B2 * | 9/2009 | Skovron | .............. | A01K 1/0107 119/165 |
| 10,517,263 B1 * | 12/2019 | Perez | ..................... | A01K 1/011 |
| D1,007,081 S * | 12/2023 | Wang | ........................... | D30/108 |
| 2002/0000205 A1 * | 1/2002 | Yamamoto | ........... | A01K 1/0114 119/161 |
| 2002/0139312 A1 * | 10/2002 | Reitz | ..................... | A01K 1/0114 119/165 |
| 2006/0169214 A1 * | 8/2006 | Turkalo | ................ | A01K 1/011 119/165 |
| 2011/0297096 A1 * | 12/2011 | Northrop | ............. | A01K 1/0107 119/161 |
| 2013/0042563 A1 * | 2/2013 | Pervan | .............. | E04F 15/02038 52/582.2 |
| 2013/0071172 A1 * | 3/2013 | Maertens | .................. | F16B 5/00 403/376 |
| 2013/0333625 A1 * | 12/2013 | Baxter | ................... | A01K 1/011 119/166 |
| 2019/0242415 A1 * | 8/2019 | Wang | ..................... | F16B 5/0016 |
| 2022/0117190 A1 * | 4/2022 | Van Wert | ............. | A01K 1/0114 |
| 2022/0142114 A1 * | 5/2022 | Baxter | ................... | A01K 1/011 |

(Continued)

FOREIGN PATENT DOCUMENTS

WO    WO-2017150086 A1 *  9/2017  .......... A01K 1/0114

Primary Examiner — Zoe Tam Tran (57) ABSTRACT

The present disclosure discloses a pet toilet comprising a base and a fecal collection box detachably provided on the base, the base defines a through hole running through itself from top to bottom, and the fecal collection box defines a fecal collection chamber in communication with the through hole and configured to collect excrement. In this way, when cleaning, the fecal collection box can be independently detached and thus processed, it is convenient for users to clean.

18 Claims, 11 Drawing Sheets (56) References Cited

U.S. PATENT DOCUMENTS

| | | | |
|---|---|---|---|
| 2023/0217888 A1* | 7/2023 | Simard | A01K 1/011 |
| | | | 119/161 |
| 2023/0217889 A1* | 7/2023 | Rusch | A01K 1/0107 |
| | | | 119/166 |
| 2024/0114874 A1* | 4/2024 | Zhang | A01K 1/0114 |

* cited by examiner

PET TOILET WITH A DETACHABLE FECAL COLLECTION BOX TO A BOTTOM OF A BASE

CROSS-REFERENCE TO RELATED APPLICATIONS

The application claims priority of Chinese patent application CN2023234197826, filed on Dec. 14, 2023, which is incorporated herein by reference in its entireties.

TECHNICAL FIELD

The present disclosure relates to the technical field of pet products, in particular to a pet toilet.

BACKGROUND ART

In order to facilitate users in cleaning feces of pet cats, an intelligent cat litter box has appeared on the current market. It includes a base and a roller rotatably arranged on the base, and the roller is provided therein with a sieve screen and a storage chamber. When the roller rotates, cat litter, and excrement formed by combination of feces and cat litter are first sieved by the sieve screen, wherein the cat litter passes through the sieve screen and falls into the storage chamber for storage, and the excrement is discharged from a first opening of the roller along surfaces of the sieve screen and the storage chamber and falls into a fecal collection chamber in the base to achieve the function of cleaning feces, without the tedious operation of manual sieving with a cat litter shovel handled by the user.

However, at present, in the existing intelligent cat litter box, the fecal collection chamber is integrated with the base and undetachable, which is inconvenient for cleaning the fecal collection chamber. Moreover, the fecal collection chamber is all-in-one shaped by injection molding and unable to change the volume thereof. During transportation, it will result in a large volume of the entire intelligent cat litter box, which is inconvenient to transport and increases transportation cost.

SUMMARY

A main purpose of the present disclosure is to provide a pet toilet configured to solve the problem in the existing intelligent cat litter box that the fecal collection chamber is integrated with the base and causes inconvenient cleaning of the fecal collection chamber.

In order to solve the above technical problem, the present disclosure provides technical solutions as follows.

A pet toilet comprises a base and a fecal collection box detachably provided on the base, the base defines a through hole running through itself from top to bottom, and the fecal collection box defines a fecal collection chamber in communication with the through hole and configured to collect excrement.

Furthermore, a bottom of the base is provided with insertion slots at two sides of the through hole, two sides of the fecal collection box protrude outward to form insertion flanges, the insertion flanges are inserted in the insertion slots when the fecal collection box is mounted on the base.

Furthermore, between the insertion flange and the base there is provided with a joint structure, the joint structure comprises a first bump and a first clamping groove used in conjunction with the first bump, the first bump is placed in the first clamping groove when the fecal collection box is mounted on the base.

Furthermore, the first bump is formed by upward protrusion of a top surface of the insertion flange, the insertion flange defines strip-type holes at both front and rear sides of the first bump, and the insertion flange forms a resilient piece between the two strip-type holes, the first bump is located on the resilient piece.

Furthermore, the base protrudes downward at two sides of the through hole to form limit protrusions, a cross-section of the insertion slot is C-shaped, the limit protrusions are located at a side of the insertion slot close to the through hole and are arranged separately from the insertion slot.

Furthermore, the limit protrusion comprises a first housing provided on the base and a light guide casing connected to the first housing to form a mounting chamber, the mounting chamber is provided therein with a lamp board, the lamp board is provided thereon with a plurality of luminous bodies.

Furthermore, the insertion flange extends downwards at a side away from the through hole to form an enhancing flange, the strip-type holes run through the enhancing flange from top to bottom.

Furthermore, the base extends downward at a bottom of the insertion slot to form a block flange.

Furthermore, a rear side wall of the fecal collection box defines a first gap in communication with the fecal collection chamber.

Furthermore, the fecal collection box comprises at least one extension frame and a fixing basin, the extension frame is sheathed on an outer side of the fixing basin and detachably connected with the fixing basin; the extension frame is of a hollow shape, and both a bottom and top thereof are first openings; the fixing basin is of a hollow shape, and a top thereof is a second opening; the fecal collection chamber is surrounded and formed by the extension frame and the fixing basin.

Furthermore, the pet toilet further comprises a roller rotatably provided on the base, the roller defines an entrance/exit used for pets to enter and exit, a width of the extension frame is less than a width of the entrance/exit, and a length of the roller is larger than a length of the extension frame.

Furthermore, the fecal collection box comprises a plurality of extension frames, the plurality of extension frames are sheathed sequentially from inside to outside according to sizes, and there is interference fit between every two adjacent extension frames, the insertion flange is located on the outermost extension frame.

Furthermore, an inner side wall of the extension frame is provided thereon with a first limit member, an outer side wall of the fixing basin is provided thereon with a second limit member, the first limit member abuts against the second limit member when the fixing basin is assembled with the extension frame.

Furthermore, the first limit member comprises a first limit flange extending inward from a bottom of the extension frame and a first straight wall extending upward from a distal end of the first limit flange, an inner side wall of the extension frame, the first limit flange, and the first straight wall surround to form a first limit groove; the second limit member comprises a second limit flange formed by outward extension from a top of the fixing basin and a second straight wall extending downward from a distal end of the second limit flange, an outer sidewall of the fixing basin, the second limit flange, and the second straight wall surround to form a second limit groove; the first straight wall is positioned in the second limit groove, and the second straight wall is positioned in the first limit groove.

Furthermore, the first limit flange defines a plurality of drain holes.

Furthermore, the second limit flange and/or the second straight wall defines a second gap.

Furthermore, the inner side wall of the extension frame is provided thereon with a fixture block configured to stop relative movement of the fixing basin and the extension frame, the fixture block is located above the first limit member.

Furthermore, side walls of the first limit groove and/or the second limit groove are provided thereon with a plurality of pressing protrusions, and the first limit groove and/or the second limit groove defines second clamping grooves at positions corresponding to the pressing protrusions.

Furthermore, a distance between two opposite side walls of the extension frame gradually reduces from top to bottom, and a distance between two opposite side walls of the fixing basin gradually reduces from top to bottom; the second limit member is in interference fit with the extension frame.

Furthermore, the fecal collection box is provided thereon with a handle groove, and the base is provided with at least three support legs around the fecal collection box.

The present disclosure has the following advantageous effect: in comparison with the prior art, the fecal collection box of the present disclosure is detachably provided on the base; in this way, when cleaning, the fecal collection box can be independently detached and thus processed, it is convenient for users to clean.

BRIEF DESCRIPTION OF THE DRAWINGS

In order to explain technical solutions in embodiments of the present disclosure or in the prior art more clearly, drawings required to be used in description of the embodiments or of the prior art will be briefly introduced below. Obviously, the drawings in the following description are only some embodiments of the present disclosure. For those skilled in the art, other drawings can be further obtained according to structures shown in these drawings on the premise of paying no creative work.

DETAILED DESCRIPTION OF THE EMBODIMENTS

The technical solutions in the embodiments of the present disclosure will be described clearly and completely below in combination with the drawings in the embodiments of the present disclosure. Obviously, the described embodiments are merely some embodiments of the present disclosure, rather than all embodiments. Based on the embodiments of the present disclosure, any other embodiment obtained by one of ordinary skill in the art on the premise of paying no creative work should belong to the protection scope of the present disclosure.

Referring to FIGS. 1-13, a pet toilet is provided in embodiments of the present disclosure.

Figure 1:
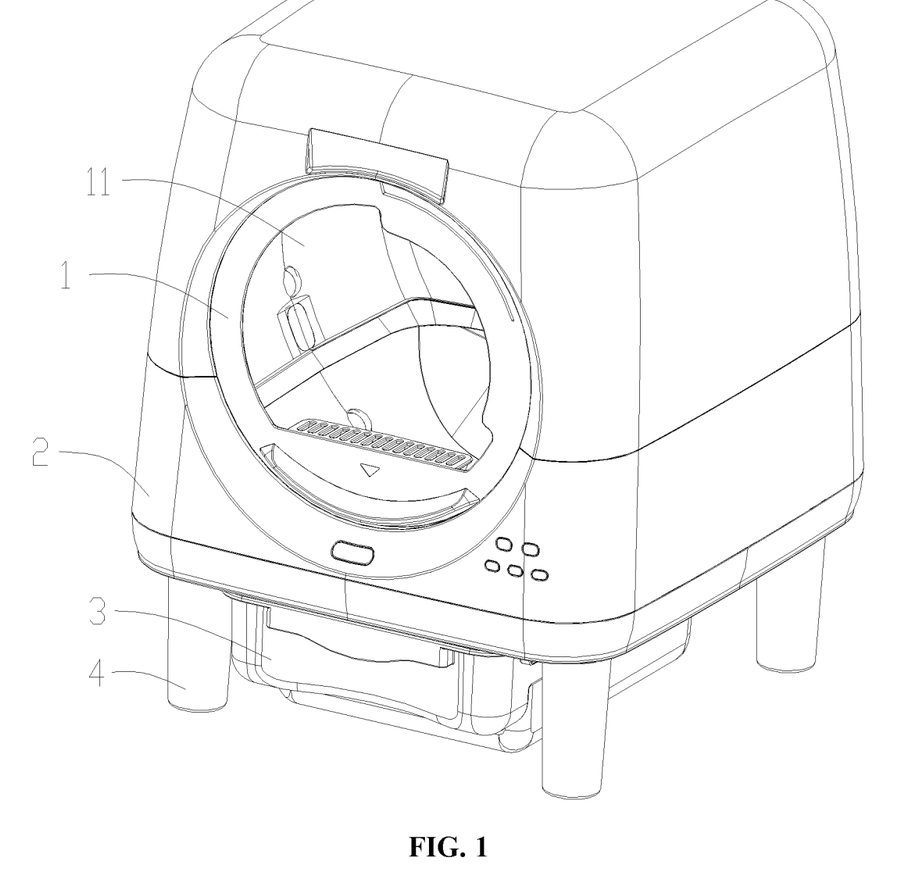
FIG. 1 is a stereoscopic view of the present disclosure.
Figure 2:
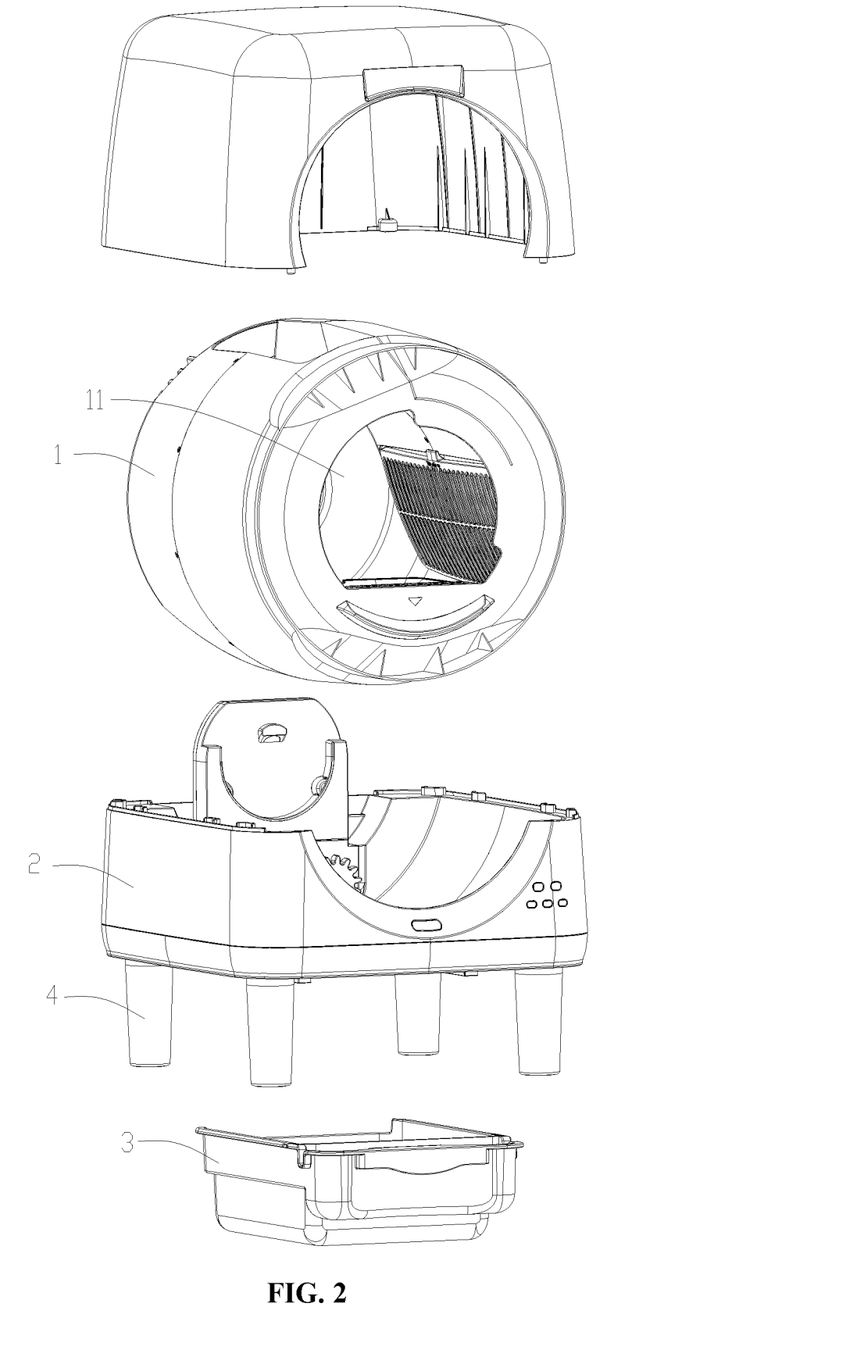
FIG. 2 is a partially disassembled view of the present disclosure.
Figure 3:
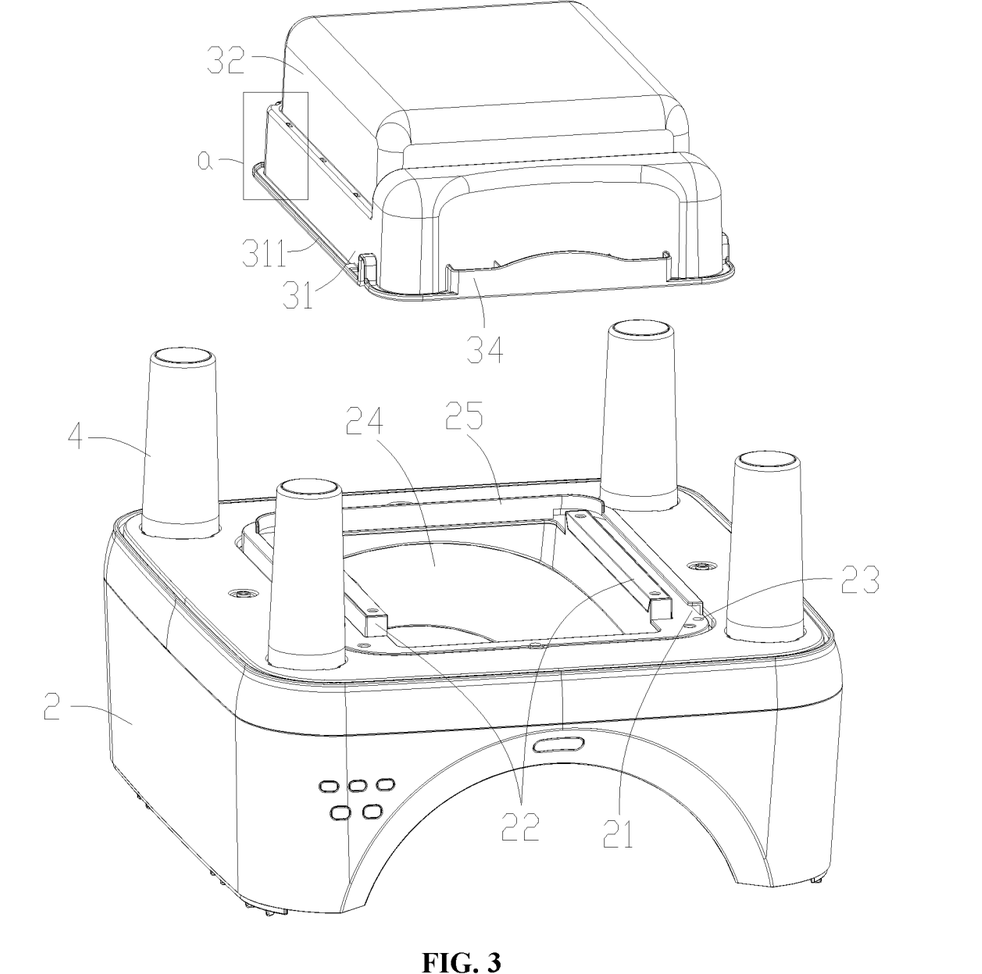
FIG. 3 is a disassembled view of a base and a fecal collection box of the present disclosure.

Referring to FIGS. 1-3, the pet toilet includes a base 2 and a fecal collection box 3 detachably provided on the base 2, the base 2 defines a through hole 24 running through itself from top to bottom, and the fecal collection box 3 defines a fecal collection chamber 33 in communication with the through hole 24 and configured to collect excrement.

In this embodiment, the fecal collection box 3 is detachably provided on the base 2. In this way, when cleaning, the fecal collection box 3 can be independently detached and thus processed, it is convenient for users to clean, thereby solving the problem in the existing intelligent cat litter box that the fecal collection chamber is integrated with the base and causes inconvenient cleaning of the fecal collection chamber.

In this embodiment, the fecal collection box 3 achieves detachable assembly with the base 2 in the form of a drawer. Specifically, a bottom of the base 2 is provided with insertion slots 21 at two sides of the through hole 24, two sides of the fecal collection box 3 protrude outward to form insertion flanges 311, the insertion flanges 311 are inserted in the insertion slots 21 when the fecal collection box 3 is mounted on the base 2. In order to facilitate pulling the fecal collection box 3 out, the fecal collection box 3 is provided thereon with a handle groove 34.

In order to implement that the fecal collection box 3 is suspended to facilitate pulling and using when the pet toilet is placed, the base 2 is provided with at least three support legs 4 around the fecal collection box 3.

Furthermore, in order to facilitate transportation of the pet toilet, the support legs 4 are detachably provided on the base 2. Specifically, the support legs 4 are fixed on the base 2 in the form of buckles, screw bolts, etc.

Figure 6:
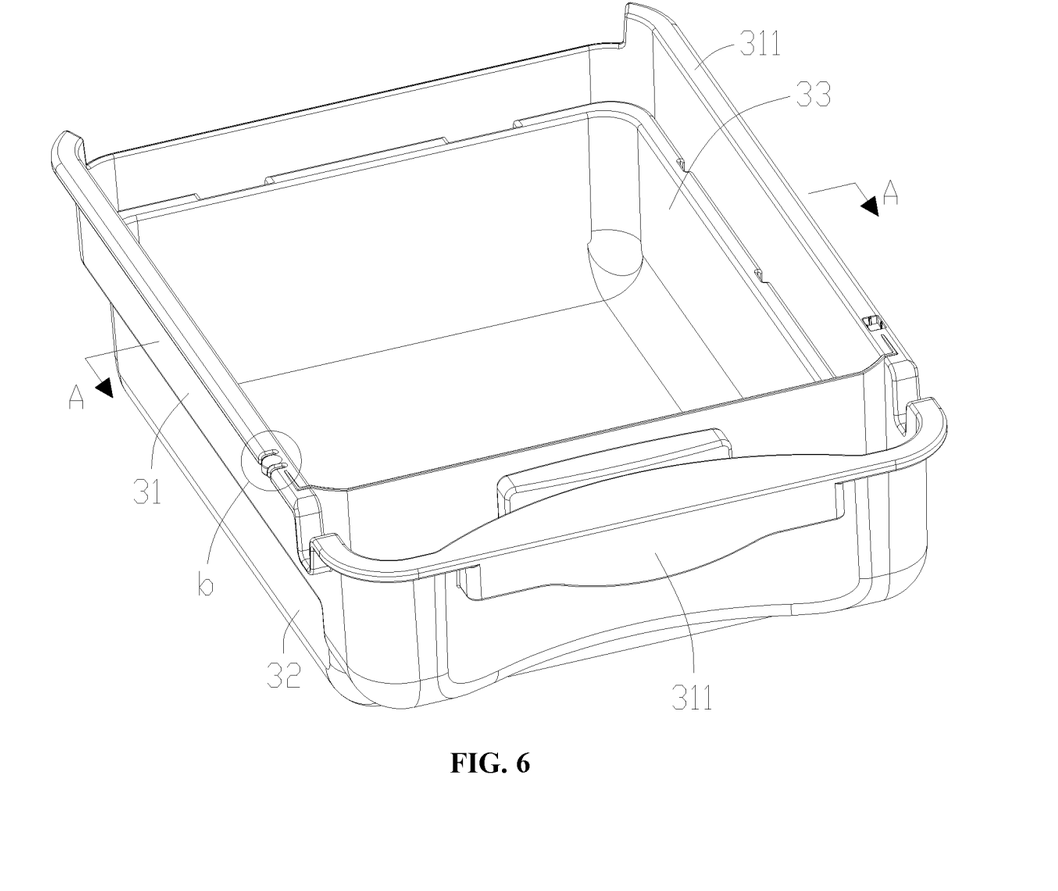
FIG. 6 is a structural view of the fecal collection box of the present disclosure.
Figure 7:
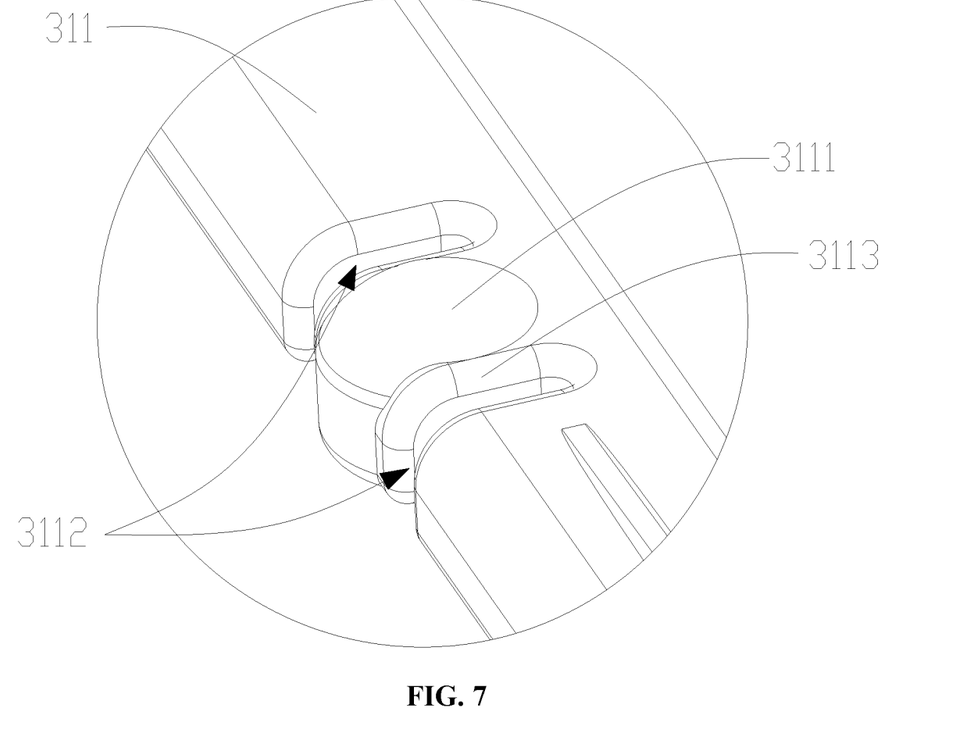
FIG. 7 is an enlarged view of the area b in FIG. 6.

In one embodiment, referring to FIG. 3 and FIGS. 6-7, between the insertion flange 311 and the base 2 there is provided with a joint structure, the joint structure includes a first bump 3111 and a first clamping groove 23 used in conjunction with the first bump 3111, the first bump 3111 is placed in the first clamping groove 23 when the fecal collection box 3 is mounted on the base 2, thereby playing a role of limiting the fecal collection box 3. Moreover, the first bump 3111 is used to add a pulling friction force between the fecal collection box 3 and the base 2 and provide insertion and pulling feeling when the fecal collection box 3 is mounted on the base 2. Additionally, by placing the first bump 3111 in the first clamping groove 23, there will be a "click" feeling, which can provide a function of reminding users that fecal collection box 3 is mounted properly.

Specifically, the first bump 3111 is of a spherical protrusion structure, the shape of the first clamping groove 23 matches with the shape of the first bump 3111, and an opening of the first clamping groove 23 is a round chamfer, thereby facilitating placing the first bump 3111 in the first clamping groove 23 for convenient use.

In a preferred embodiment, in order to prevent squeezing between the first bump 3111 and the base 2 from affecting smoothness of pulling the fecal collection box 3, the first bump 3111 is formed by upward protrusion of a top surface of the insertion flange 311, the insertion flange 311 defines strip-type holes 3112 at both front and rear sides of the first bump 3111, and the insertion flange 311 forms a resilient piece 3113 between the two strip-type holes 3112, the first bump 3111 is located on the resilient piece 3113. By resilience of the resilient piece 3113, a friction between the first bump 3111 and the base 2 is reduced, it is realized that the smoothness of pulling is not affected when a user is provided with pulling feeling.

In one embodiment, the base 2 protrudes downward at two sides of the through hole 24 to form limit protrusions 22, a cross-section of the insertion slot 21 is C-shaped, the limit protrusions 22 are located at a side of the insertion slot 21 close to the through hole 24 and are arranged separately from the insertion slot 24. The limit protrusions 22 are used to cooperate with the insertion slot 21 to limit the fecal collection box 3, the stability of mounting the fecal collection box 3 can be improved.

Figure 5:
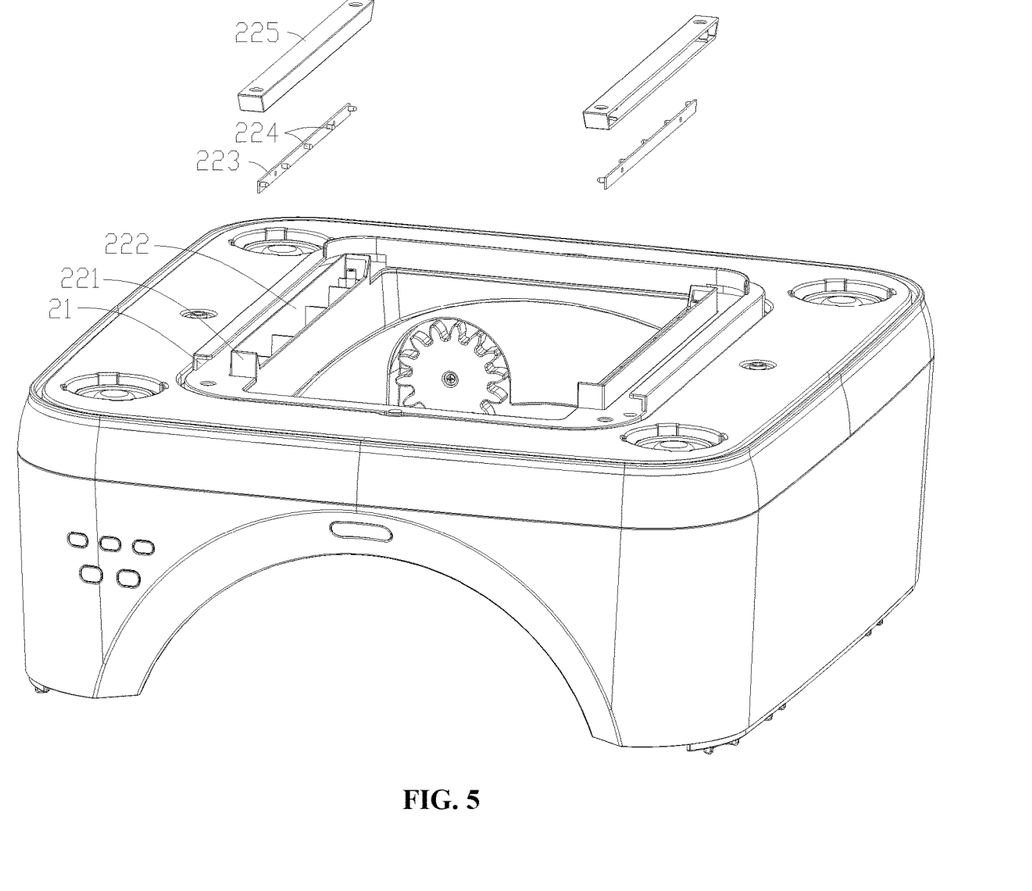
FIG. 5 is a partially disassembled view of the base of the present disclosure.

In one embodiment, referring to FIG. 5, the limit protrusion 22 includes a first housing 221 provided on the base 2 and a light guide casing 225 connected to the first housing 221 to form a mounting chamber 222, the mounting chamber 222 is provided therein with a lamp board 223, the lamp board 223 is provided thereon with a plurality of luminous bodies 224. Specifically, the luminous bodies 224 can be lamp beads, LED lamps, etc. By light emitted by the luminous bodies 224, users can easily check the amount of excrement at night, making it convenient for them to use.

Figure 4:
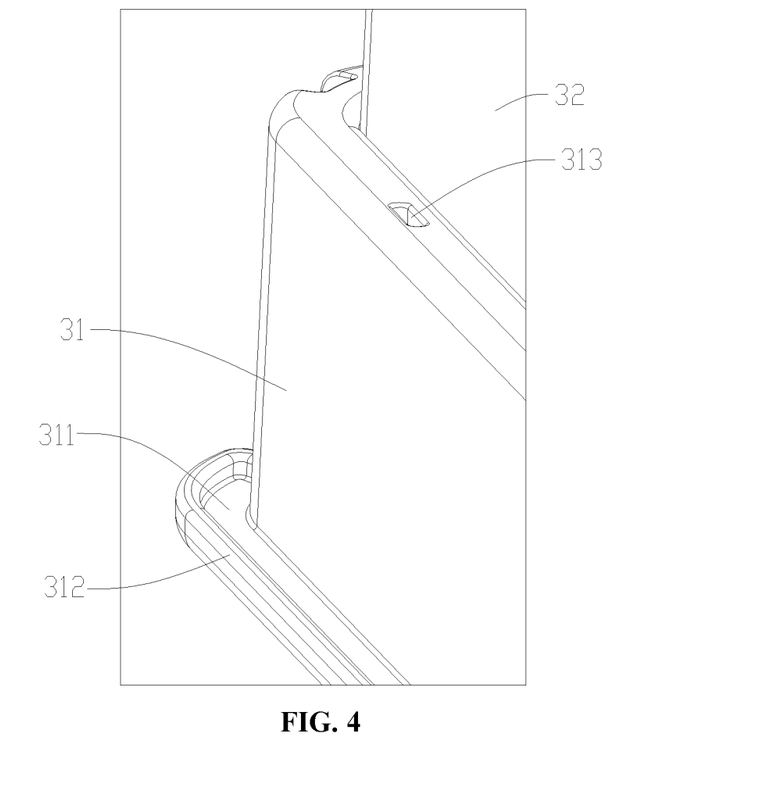
FIG. 4 is an enlarged view of the area a in FIG. 3.

In one embodiment, referring to FIG. 4, the insertion flange 311 extends downwards at a side away from the through hole 24 to form an enhancing flange 312, the strip-type holes 3112 run through the enhancing flange 312 from top to bottom. In this way, the strength of the insertion flange 311 can be improved, and the texture of the insertion flange 311 can be improved, thereby making the pulling structure be thicker.

In one embodiment, referring to FIG. 3, the base 2 extends downward at a bottom of the insertion slot 21 to form a block flange 25. By the block flange 25, it is possible to limit the stroke of pulling the fecal collection box 3 and improve the strength of connection between the fecal collection box 3 and the base 2, and a gap between the fecal collection box 3 and the base 2 can be blocked, thereby improving product aesthetics.

Figure 11:
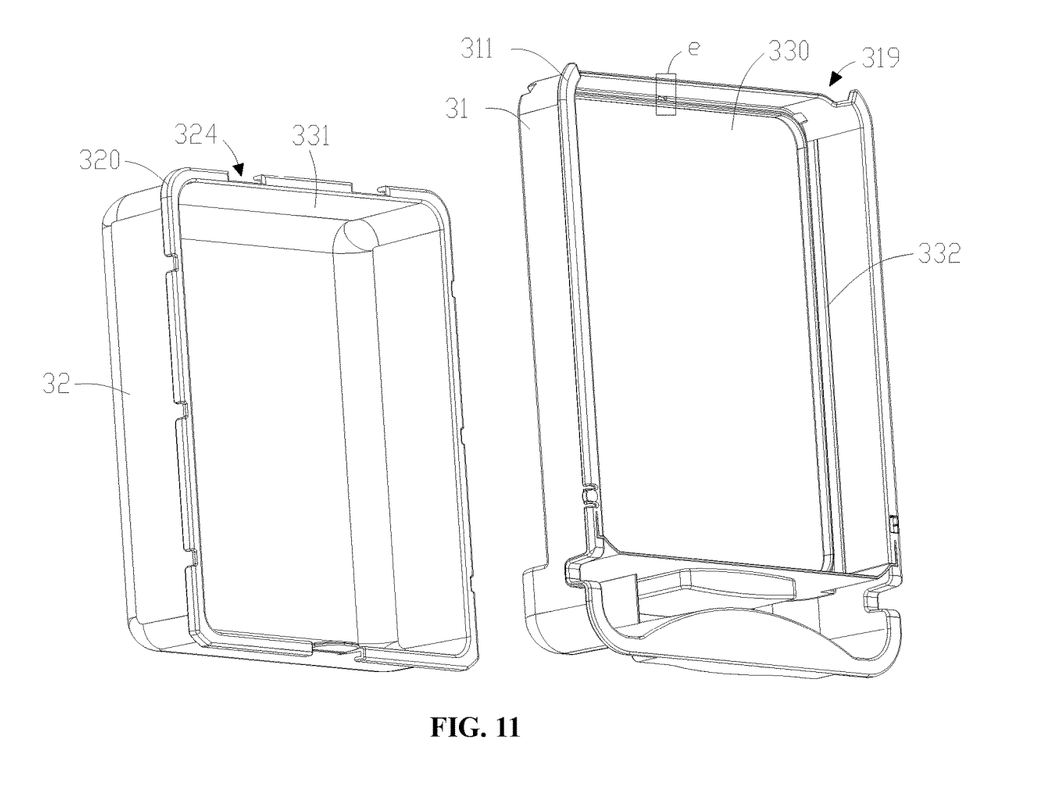
FIG. 11 is a disassembled view of the fecal collection box in the present disclosure.

In one embodiment, referring to FIG. 11, a rear side wall of the fecal collection box 3 defines a first gap 319 in communication with the fecal collection chamber 33. By the first gap 319, it is convenient to pour excrement in the fecal collection box 3 out, and the first gap 319 and the block flange 25 are provided oppositely, a bottom surface of the first gap 319 does not exceed a bottom of the block flange 25, such that the first gap 319 is blocked when the fecal collection box 3 is mounted on the base 2, thereby preventing the first gap 319 from affecting a roller 1 of the pet toilet discharges excrement to outside of the fecal collection box 3.

Figure 13:
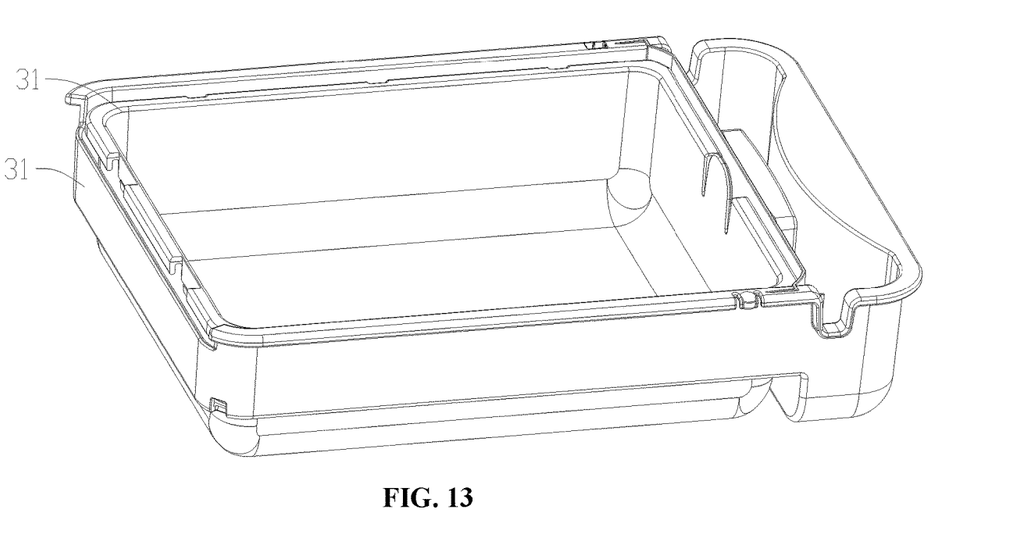
FIG. 13 is a schematic view of the fecal collection box of the present disclosure in a folded state.

In one embodiment, referring to FIG. 6, the fecal collection box 3 includes at least one extension frames 31 and a fixing basin 32, the extension frame 31 is sheathed on an outer side of the fixing basin 32 and detachably connected with the fixing basin 32. The extension frame 31 is of a hollow shape, and both a bottom and top thereof are first openings 330; the fixing basin 32 is of a hollow shape, and a top thereof is a second opening 331; the fecal collection chamber 33 is surrounded and formed by the extension frame 31 and the fixing basin 32. In this way, when the pet toilet in this embodiment is packaged or transported, the fixing basin 32 and the extension frames 31 can be located at the same horizontal plane, that is, the fixing basin 32 and the extension frames 31 are placed in coincidence, as shown in FIG. 13, such that the entire height of the whole fecal collection box 3 can be reduced, and thus the volume of the pet toilet after being packaged can be reduced to facilitate transportation.

In one embodiment, the pet toilet in this embodiment further includes a roller 1 rotatably provided on the base 2, the roller 1 defines an entrance/exit 11 used for pets to enter and exit, a width of the extension frame 31 is less than a width of the entrance/exit 11, and a length of the roller 1 is larger than a length of the extension frame 31. In this way, when the fixing basin 32 and the extension frames 31 are detached and placed in coincide, the whole fecal collection box 3 can pass through the entrance/exit 11 and placed in the roller 1, it is possible to effectively reduce the whole volume of the pet toilet, reduce the transported volume, and further facilitate produce transportation and reduce transportation cost.

In one embodiment, an inner side wall of the extension frame 31 is provided thereon with a first limit member 316, an outer side wall of the fixing basin 32 is provided thereon with a second limit member 320, the first limit member 316 abuts against the second limit member 320 when the fixing basin 31 is assembled with the extension frame 320. The first limit member 316 is used to limit the stroke of movement of the second limit member 320, in use, the fixing basin 32 can be mounted on the extension frame 31.

In one embodiment, the fecal collection box 3 includes a plurality of extension frames 31, the plurality of extension frames 31 are sheathed sequentially from inside to outside according to sizes, and there is interference fit between every two adjacent extension frames 31, the insertion flange 311 is located on the outermost extension frame 31. Users can configure the extension frames 31 with an appropriate quantity according to amount of pet excrement, thereby configuring a proper volume of the fecal collection chamber 33 for use.

Figure 8:
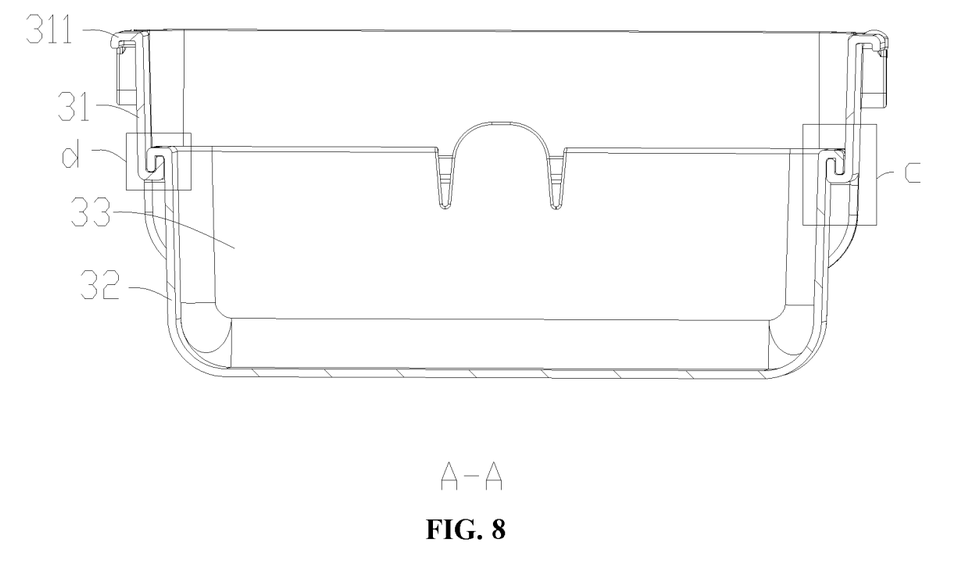
FIG. 8 is a cut-away view of the fecal collection box in the present disclosure along the direction A-A in FIG. 6.
Figure 9:
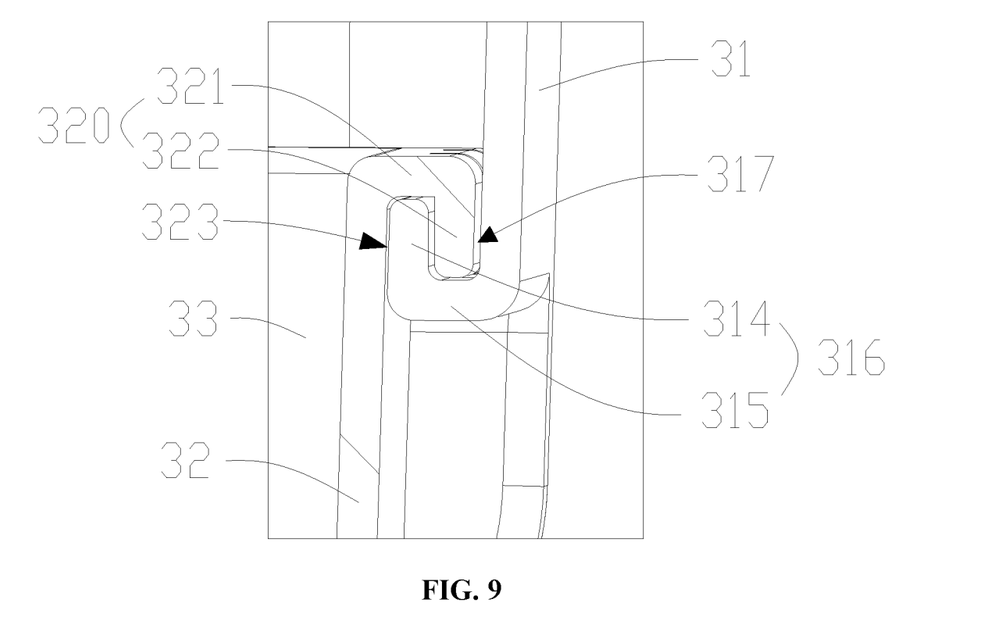
FIG. 9 is an enlarged view of the area c in FIG. 8.

Specifically, referring to FIG. 8, the first limit member 316 includes a first limit flange 315 extending inward from a bottom of the extension frame 31 and a first straight wall 314 extending upward from a distal end of the first limit flange 315, an inner side wall of the extension frame 31, the first limit flange 315, and the first straight wall 314 surround to form a first limit groove 317, so as to form a hook shape.

The second limit member 320 includes a second limit flange 321 formed by outward extension from a top of the fixing basin 32 and a second straight wall 322 extending downward from a distal end of the second limit flange 321, an outer sidewall of the fixing basin 32, the second limit flange 321, and the second straight wall 322 surround to form a second limit groove 323, so as to form a reversed hook shape. When the fixing basin 32 is assembled with the extension frame 31, the fixing basin 32 can be placed into the extension frame 31 from the top of the extension frame 31 and pressed downward, such that the first straight wall 321 is placed in the second limit groove 323 and the second straight wall 322 is placed in the first limit groove 317, the second straight wall 322 is used to abut against the first limit flange 315 to realize the function of supporting the fixing basin 32.

Among them, the second straight wall 322 can be in interference fit with the inner side wall of the extension frame 31. Alternatively, the inner side wall of the extension frame 31 is provided thereon with a fixture block 332, the fixture block 332 is located above the first limit member 316, as shown in FIG. 11. The protruding fixture block 332 is utilized to limit the second limit flange 321 and provide a function of limit the fixing basin 32, which is used to prevent the fixing basin 32 from moving upward, such that the extension frame 31 will not fall down when the fecal collection box 3 is placed on the ground. In other embodiments, referring to FIG. 10, side walls of the first limit groove 317 and/or the second limit groove 323 are provided thereon with a plurality of pressing protrusions 3201; by the protruding pressing protrusions 3201, the fixing basin 32 can be stably and fixedly connected with the extension frame 31, thereby preventing the fixing basin 32 from moving relative to the extension frame 31.

Figure 10:
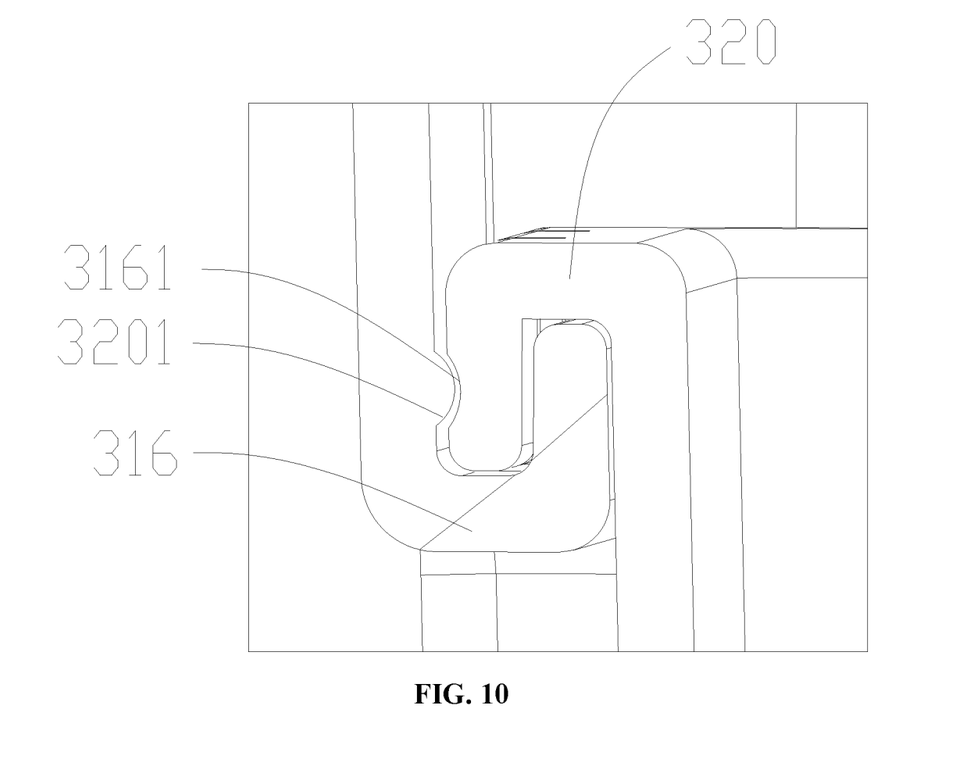
FIG. 10 is an enlarged view of the area d in FIG. 8.

Referring to FIG. 10, in the embodiment with the pressing protrusions 3201, the first limit groove 317 and/or the second limit groove 323 defines second clamping grooves 3161 at positions corresponding to the pressing protrusions 3201. When the fixing basin 32 is assembled with the extension frame 31, the pressing protrusions 3201 is utilized to be placed in the second clamping grooves 3161 to provide a function of buckle, thereby fixedly connecting the fixing basin 31 with the extension frame 32.

In one embodiment, a distance between two opposite side walls of the extension frame 31 gradually reduces from top to bottom, and a distance between two opposite side walls of the fixing basin 32 gradually reduces from top to bottom, thereby facilitating assembly between the fixing basin 32 and the extension frame 31.

Figure 12:
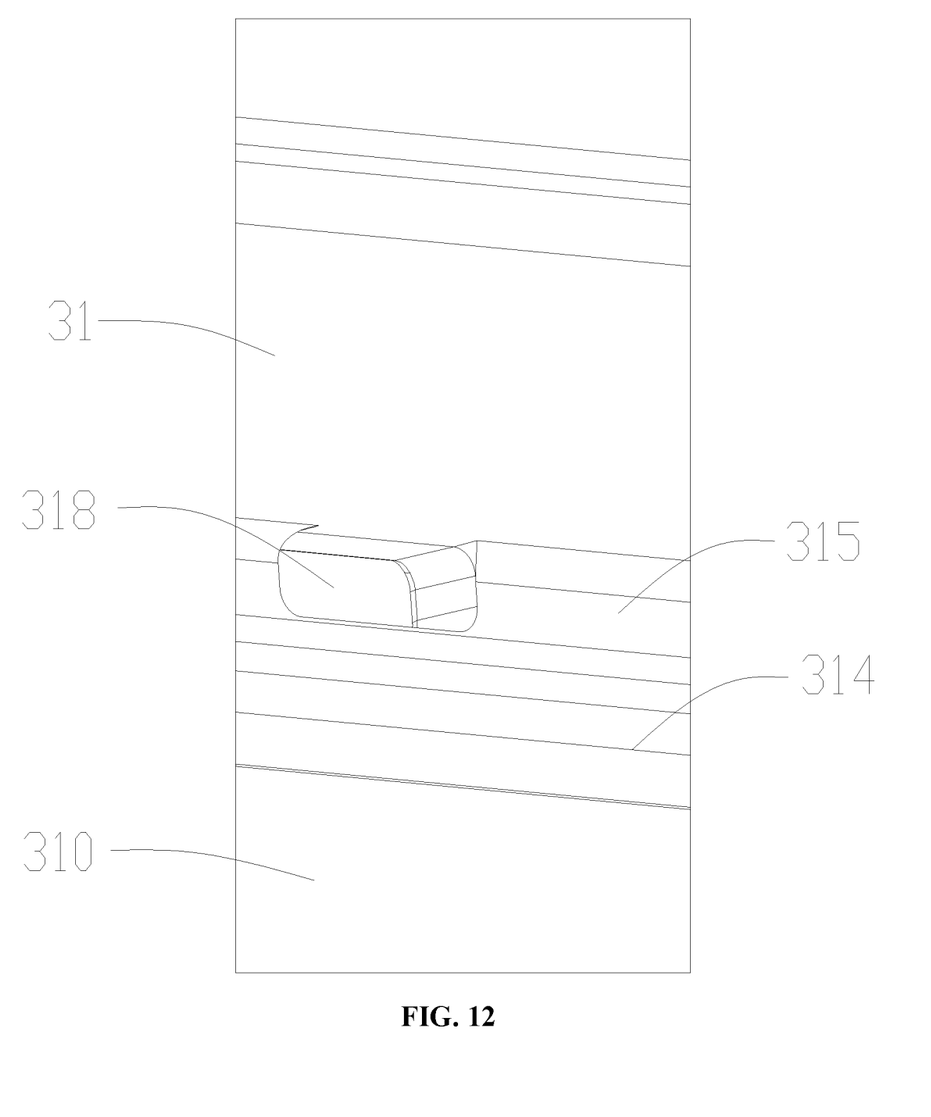
FIG. 12 is an enlarged view of the area e in FIG. 11.

In one embodiment, referring to FIG. 4 and FIG. 12, the first limit flange 315 defines a plurality of drain holes 313, which facilitates drainage of water during cleaning the fecal collection box 3 to prevent water accumulation; furthermore, by the drain holes 313, it is also possible to provide flowing air when assembling the fixing basin 32 and the extension frame 31, thereby facilitating assembly.

In one embodiment, referring to FIG. 11, the second limit flange 321 and/or the second straight wall 322 defines a second gap 324, the second gap 324 can be used for drainage, and can also further improve air circulation when assembling the fixing basin 32 and the extension frame 31, thereby facilitating assembly.

In other embodiments, folded manners can be adopted between the fixing basin 32 and the extension frame 31 to achieve storage or increase the volume of the fecal collection chamber 33. Among them, a soft rubber plate is provided between the fixing basin 32 and the extension frame 31, and the soft rubber plate is provided with creases at joints with the fixing basin 32 and the extension frame 31, thereby achieving storage of the fixing basin 32 in the extension frame 31.

It should be noted that all directional indications (such as up, down, left, right, front, back . . . ) in embodiments of the present disclosure are only used to explain relative position relationships, motion situations, and so on among components in a specific posture (as shown in the drawings). If the specific posture changes, the directional indications also change accordingly.

In addition, the description related to "first", "second", and the like in the present disclosure is only for the purpose of description and cannot be understood as indicating or implying their relative importance or implying the number of indicated technical features. Therefore, features limited as "first" and "second" can explicitly or implicitly include at least one of these features. In addition, "and/or" in the entire text includes three solutions, taking A and/or B as examples, including the A technical solution, the B technical solution, and the technical solution that meets both A and B. In addition, technical solutions of various embodiments can be combined with each other, but must be based on what ordinary technicians in the art can achieve. When the combination of technical solutions is contradictory or impossible to achieve, it should be considered that the combination of such technical solutions does not exist and is not within the protection scope required by the present disclosure.

The above described are only preferred embodiments of the present disclosure and not intended to limit the patent scope of the present disclosure. Under the inventive concept of the present disclosure, any equivalent structural change made using content of the description and drawings of the present disclosure, or directly/indirectly application in other related technical fields, are included in the patent protection scope of the present disclosure.

What is claimed is:

1. A pet toilet comprising: a base and a fecal collection box detachably provided on the base, the base defines a through hole running through itself from top to bottom, and the fecal collection box defines a fecal collection chamber in communication with the through hole and configured to collect excrement,
wherein a bottom of the base is provided with insertion slots at two sides of the through hole, two sides of the fecal collection box protrude outward to form insertion flanges, the insertion flanges are inserted in the insertion slots when the fecal collection box is mounted on the base,
wherein between the insertion flange and the base there is provided with a joint structure, the joint structure comprises a first bump and a first clamping groove used in conjunction with the first bump, the first bump is placed in the first clamping groove when the fecal collection box is mounted on the base.

2. The pet toilet according to claim 1, wherein the first bump is formed by upward protrusion of a top surface of the insertion flange, the insertion flange defines strip-type holes at both front and rear sides of the first bump, and the insertion flange forms a resilient piece between the two strip-type holes, the first bump is located on the resilient piece.

3. A pet toilet comprising: a base and a fecal collection box detachably provided on the base, the base defines a through hole running through itself from top to bottom, and the fecal collection box defines a fecal collection chamber in communication with the through hole and configured to collect excrement,
wherein a bottom of the base is provided with insertion slots at two sides of the through hole, two sides of the fecal collection box protrude outward to form insertion flanges, the insertion flanges are inserted in the insertion slots when the fecal collection box is mounted on the base,
wherein the base protrudes downward at two sides of the through hole to form limit protrusions, a cross-section of the insertion slot is C-shaped, the limit protrusions are located at a side of the insertion slot close to the through hole and are arranged separately from the insertion slot.

4. The pet toilet according to claim 3, wherein the limit protrusion comprises a first housing provided on the base and a light guide casing connected to the first housing to form a mounting chamber, the mounting chamber is provided therein with a lamp board, the lamp board is provided thereon with a plurality of luminous bodies.

5. The pet toilet according to claim 2, wherein the insertion flange extends downwards at a side away from the through hole to form an enhancing flange, the strip-type holes run through the enhancing flange from top to bottom.

6. The pet toilet according to claim 1, wherein the base extends downward at a bottom of the insertion slot to form a block flange.

7. The pet toilet according to claim 1, wherein a rear side wall of the fecal collection box defines a first gap in communication with the fecal collection chamber.

8. The pet toilet according to claim 1, wherein the fecal collection box comprises at least one extension frame and a fixing basin, the at least one extension frame is sheathed on an outer side of the fixing basin and detachably connected with the fixing basin;

the at least one extension frame is of a hollow shape, and both a bottom and top thereof are first openings; the fixing basin is of a hollow shape, and a top thereof is a second opening; the fecal collection chamber is surrounded and formed by the at least one extension frame and the fixing basin.

9. The pet toilet according to claim 8, further comprising a roller rotatably provided on the base, the roller defines an entrance/exit used for pets to enter and exit, a width of the at least one extension frame is less than a width of the entrance/exit, and a length of the roller is larger than a length of the at least one extension frame.

10. A pet toilet comprising: a base and a fecal collection box detachably provided on the base, the base defines a through hole running through itself from top to bottom, and the fecal collection box defines a fecal collection chamber in communication with the through hole and configured to collect excrement, wherein the fecal collection box comprises at least one extension frame and a fixing basin, the at least one extension frame is sheathed on an outer side of the fixing basin and detachably connected with the fixing basin;

the at least one extension frame is of a hollow shape, and both a bottom and top thereof are first openings; the fixing basin is of a hollow shape, and a top thereof is a second opening; the fecal collection chamber is surrounded and formed by the at least one extension frame and the fixing basin, wherein the at least one extension frame comprises a plurality of extension frames, the plurality of extension frames are sheathed sequentially from inside to outside according to sizes, and there is interference fit between every two adjacent extension frames, the insertion flange is located on the outermost extension frame.

11. The pet toilet according to claim 8, wherein an inner side wall of each extension frame is provided thereon with a first limit member, an outer side wall of the fixing basin is provided thereon with a second limit member, the first limit member abuts against the second limit member when the fixing basin is assembled with the extension frame.

12. The pet toilet according to claim 10, wherein the first limit member comprises a first limit flange extending inward from a bottom of the extension frame and a first straight wall extending upward from a distal end of the first limit flange, an inner side wall of the extension frame, the first limit flange, and the first straight wall surround to form a first limit groove;

the second limit member comprises a second limit flange formed by outward extension from a top of the fixing basin and a second straight wall extending downward from a distal end of the second limit flange, an outer sidewall of the fixing basin, the second limit flange, and the second straight wall surround to form a second limit groove; the first straight wall is positioned in the second limit groove, and the second straight wall is positioned in the first limit groove.

13. The pet toilet according to claim 10, wherein the first limit flange defines a plurality of drain holes.

14. The pet toilet according to claim 10, wherein the second limit flange and/or the second straight wall defines a second gap.

15. The pet toilet according to claim 10, wherein the inner side wall of the extension frame is provided thereon with a fixture block configured to stop relative movement of the fixing basin and the extension frame, the fixture block is located above the first limit member.

16. The pet toilet according to claim 10, wherein side walls of the first limit groove and/or the second limit groove are provided thereon with a plurality of pressing protrusions, and the first limit groove and/or the second limit groove defines second clamping grooves at positions corresponding to the pressing protrusions.

17. The pet toilet according to claim 10, wherein a distance between two opposite side walls of the extension frame gradually reduces from top to bottom, and a distance between two opposite side walls of the fixing basin gradually reduces from top to bottom; the second limit member is in interference fit with the extension frame.

18. The pet toilet according to claim 1, wherein the fecal collection box is provided thereon with a handle groove, and the base is provided with at least three support legs around the fecal collection box.

* * * * *